United States Patent [19]

Schneider

[11] Patent Number: 5,781,541
[45] Date of Patent: Jul. 14, 1998

[54] CDMA SYSTEM HAVING TIME-DISTRIBUTED TRANSMISSION PATHS FOR MULTIPATH RECEPTION

[75] Inventor: Allan Schneider, Falls Church, Va.

[73] Assignee: Bell Atlantic Network Services, Inc., Arlington, Va.

[21] Appl. No.: 434,434

[22] Filed: May 3, 1995

[51] Int. Cl.$^6$ .................................................... H04J 13/00
[52] U.S. Cl. ........................ 370/335; 370/342; 375/299; 375/347; 455/52.1
[58] Field of Search ................... 370/18, 21, 22, 370/19, 108; 455/33.3, 52.1, 52.3; 375/205, 206, 299, 347

[56] References Cited

U.S. PATENT DOCUMENTS

| | | | |
|---|---|---|---|
| 5,101,501 | 3/1992 | Gilhousen et al. | 455/33.2 |
| 5,109,390 | 4/1992 | Gilhousen et al. | 370/335 |
| 5,195,090 | 3/1993 | Bolliger et al. | 370/314 |
| 5,243,598 | 9/1993 | Lee | 370/332 |
| 5,267,261 | 11/1993 | Blakeney, II et al. | 370/332 |
| 5,278,892 | 1/1994 | Bolliger et al. | 379/60 |
| 5,280,472 | 1/1994 | Gilhousen et al. | 375/205 |
| 5,305,308 | 4/1994 | English et al. | 370/335 |
| 5,375,140 | 12/1994 | Bustamante et al. | 370/18 |
| 5,381,443 | 1/1995 | Borth et al. | 375/202 |
| 5,437,055 | 7/1995 | Wheatley, III | 455/33.3 |
| 5,497,395 | 3/1996 | Jou | 370/18 |
| 5,513,176 | 4/1996 | Dean et al. | 370/18 |
| 5,533,011 | 7/1996 | Dean et al. | 370/18 |

OTHER PUBLICATIONS

The CDMA Standard, David P. Whipple, *Applied Microwave & Wireless*, pp. 28–37.

*Primary Examiner*—Benedict V. Safourek
*Assistant Examiner*—Min Jung
*Attorney, Agent, or Firm*—Lowe, Price, LeBlanc & Becker

[57] ABSTRACT

An arrangement (apparatus and method) for providing a code division multiple access (CDMA) transmission system in an urban environment using spatially-diverse antennas and time-diversity devices and techniques to provide improved cell coverage without the detrimental effects of multipath (Rayleigh) fading. The spatially-diverse antennas output identical CDMA-modulated signals to a serving area at different times, whereby each CDMA-modulated signal output from a corresponding antenna has a sufficent delay to avoid mutual interference with the identical CDMA-modulated signals output from other antennas. The delay assigned to each antenna is within a range greater than a chip interval, and less than or equal to a base station sequence offset between base stations. As a result, a subscriber station is able to separately demodulate the received CDMA-modulated signals from the different antennas as CDMA signals having adequate multipath delay for demodulation using a rake receiver. The delays may be implemented as delay devices supplying delayed system clock signals from a GPS receiver to corresponding base stations having identical spreading sequences. Alternatively, the delays may be implemented as successively delaying a CDMA-modulated signal output by a single base station before transmission to the antennas along corresponding transmission paths.

51 Claims, 6 Drawing Sheets

CDMA SYSTEM HAVING TIME-DISTRIBUTED TRANSMISSION PATHS FOR MULTIPATH RECEPTION

Technical Field

The present invention relates to code-division multiple access (CDMA) systems for use in cellular telephone and personal communications systems (PCS) applications.

Background Art

Digital cellular communication systems have been developed to overcome the disadvantages in analog cellular systems, including noise susceptibility and limitations in spectrum efficiency. For example, the interim standard entitled "MOBILE STATION-BASE STATION COMPATIBILITY STANDARD FOR DUAL MODE WIDEBAND SPREAD SPECTRUM CELLULAR SYSTEM" was issued as IS-95(PN-3118, Dec. 9, 1992) by the Telecommunications Industry Association ("TIA") as an exemplary implementation for digital cellular systems using code-division multiple access (CDMA), the disclosure of which is incorporated herein by reference.

With CDMA, each transmitted signal comprises a different pseudorandom binary sequence, also referred to as a pseudonoise (PN) sequence, that modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system. CDMA interference therefore can be controlled, with the goal of increasing system capacity, on the basis of the reduction in signal-to-noise ratio caused by other users within the cellular CDMA system. Thus, a goal in any CDMA system is to limit the power output of transmitters in order to minimize the cumulative system noise caused by the other users in the CDMA system.

The use of CDMA has also been proposed for Personal Communication Services (PCS). A proposed standard for a CDMA PCS system has been submitted by the Joint Technical Committee of the TIA, entitled PN-3384, "PERSONAL STATION-BASE STATION COMPATIBILITY REQUIREMENTS FOR 1.8 TO 2.0 GHz CODE DIVISION MULTIPLE ACCESS (CDMA) PERSONAL COMMUNICATIONS SYSTEMS", Nov. 3, 1994, the disclosure of which is incorporated herein by reference. The PCS proposed standard PN-3384 specifies enhanced services including transmission rates up to 14.4 kbps for enhanced speech quality, full data services at rates up to about 13 kbps, and simultaneous transmission of voice and data. The CDMA PCS system is adapted to operate in any of the licensed PCS frequency allocations from the FCC, currently assigned at 1930–1990 MHz band for the forward CDMA channel (base station to subscriber), and 1850–1910 MHz for the reverse CDMA channel (subscriber to base station).

In implementing CDMA systems in urban environments having a plurality of building structures, it is difficult if not impossible to establish a cell with adequate coverage in a downtown area due to the propagation characteristics inherent in a downtown urban environment. Specifically, an urban environment typically will not enable line-of-sight propagation; consequently, shadow regions will be present in an urban setting due to blocking building structures. For example, a cell may not be able to provide coverage down at a street level if the cell antenna were erected on the top of a taller building; similarly, a cell may be unable to provide coverage throughout buildings or skyscrapers if the cell antenna were erected at lower elevations. Consequently, a CDMA cell signal may need to be simulcast from a multiplicity of cells in order to ensure adequate coverage.

One proposal to overcome the problems associated with shadowing and increased capacity is to provide microcells, wherein a heavily-populated region having an area corresponding to a typical cell is served by a plurality of smaller microcells. However, when the cell size becomes smaller, the control of interference among the cells and the microcells becomes more difficult. In addition, the number of handoffs between microcells increases as cell size is reduced for a given capacity. Also, the probability of dropped calls due to unsuccessful handoff increases. For example, the handoff time from the beginning of the initiation to the action completion may take up to fifteen (15) seconds. If a subscriber station is moving at a speed of 25 km/h (7 meters/s), the subscriber station will travel 105 meters in fifteen seconds; if the subscriber station is moving at a speed of 50 km/h, the subscriber station will travel 205 meters in fifteen seconds. Thus, since the overlapped region of a 0.5 km radius microcell is relatively small, the subscriber station may pass through the overlapped region before handoff action is complete, resulting in a dropped call.

In addition, an urban environment may render the conventional honeycomb coverage pattern ineffective. Shadow patterns may be relatively complex in an urban environment, thereby requiring an inordinate amount of handoffs between the uneven coverage patterns. Thus, as a subscriber station, also referred to as personal station, begins to move through the downtown area in and out of the shadows caused by buildings associated with the different transmitters, the subscriber station may pick up different cell sites at different times. This results in additional handoff and backhaul. The handoff problem would be especially difficult in such an urban, downtown area where the coverage and shadowing can be rather complex such that the subscriber station moves in and out of shadows within distances of several meters. In such an urban area the MTSO would need to provide an inordinate amount of switching capability to be able to switch back and forth between the different antennae. Even systems providing soft-handoff or cell-site diversity so that a subscriber station can communicate simultaneously with different base stations having different corresponding codes, such as U.S. Pat. No. 5,101,501 to Gilhousen et al., would suffer the problems of complex backhauling/switching requirements due to complex shadowing patterns, as well as reduced capacity due to simultaneous traffic on two traffic channels from two separate base stations.

Another proposal to address the problem of shadowing is to provide cell coverage from the "outside in", whereby cell antennas are arranged to direct signals inwardly to a serving area, as opposed to coverage from the "inside out", where cell antennas radiate outwardly to form the classic honeycomb arrangement of cells. An example of such an arrangement of cell antennas is disclosed in U.S. Pat. No. 5,243,598 to Lee. Specifically, U.S. Pat. No. 5,243,598 to Lee discloses a CDMA microcell system having a plurality of antenna sets for simultaneously transmitting and receiving CDMA signals within a microcell, whereby each antenna set is suitably positioned within the periphery of the cell and configured to cover a corresponding zone while at the same time limit propagation of signals substantially to the corresponding zone.

Thus, the CDMA microcell system disclosed by Lee operates on the assumption that if one transmitter is blocked from transmission by a building or other structure, creating a shadow in the coverage by the one transmitter, another transmitter might be able to provide coverage to go in those shadows.

However, another fundamental problem in the propagation of radio signals (including CDMA-modulated signals) is multipath fading, also referred to as Rayleigh fading, whereby multipath waves from a single source reflect from various structures (buildings, houses, etc.). When received by a subscriber station, these multipath waves will result in multiple faded signals arriving with different path delays, causing destructive interference and resulting in burst errors. This problem is of special concern in an urban setting, such as downtown urban environments, where a signal path from a base station antenna will often be reflected repeatedly from a plurality of buildings before reaching the mobile unit, so that the mobile unit will ultimately receive many echoes of a transmitted symbol.

For example, each antenna of a distributed antenna system as disclosed in Lee will have a corresponding distribution of multipath signals. FIG. 1 discloses an exemplary CDMA system having a distributed antenna arrangement of the type shown in Lee. As shown in FIG. 1, a mobile station 12 receives CDMA-modulated signals 14 from an antenna 10. In addition, the mobile station 12 receives CDMA-modulated signals 16 and 18 from antennas 20 and 22, respectively.

As shown in FIG. 1, the mobile station 12 receives a plurality of CDMA signals from different transmission paths. For example, the mobile station 12 receives a direct path 16b from antenna 20, whereas path 16a undergoes one reflection from, for example, a corner of a building. Another path 16c has three reflections between the antenna 20 and the mobile station 12. These paths 16a, 16b and 16c may each have, for example path differentials on the order of 0–400 nanoseconds in an urban environment. In addition, each of the paths 14a–c and 18a–c may have path differentials on the order of 0–600 nanoseconds. Thus, when the source of the multipath is in close proximity to the receiver, as is the case with urban environments, the spread of the delays tends to be fairly small.

However, the small distribution of delays between paths on the order of hundreds of nanoseconds are indistinguishable to a conventional CDMA rake receiver that relies on the specified IS-95 chip rate of 1.2288 MHz (813.802 ns) as the minimal time element for despreading CDMA signals. Thus, since the distribution of multipath delays is less than a single chip duration, additional multipath fading would occur between the multipath signals 14, 16 and 18.

U.S. Pat. No. 5,109,390 to Gilhousen et al. discloses a CDMA cellular diversity receiver that includes two or more pseudonoise (PN) code receivers in combination with a diversity combiner to separately receive two multipath signals having a greater than one microsecond differential path delay. Gilhousen et al. relies on the assumption that two multipaths having a greater than one microsecond differential path delay exhibit independence in multipath fading, i.e., do not fade together, so that the outputs of the two receivers can be diversity combined. As shown above, however, multipath fading may occur between different signals having path differentials less than one chip duration (813.802 ns). In addition, Gilhousen et al. admit that a loss in performance occurs when both receivers experience fades at the same time. Therefore, since multiple paths and signal strengths constantly vary as a subscriber unit moves through the physical environment, there still remains a likelihood that fading will occur in a complex urban environment.

DISCLOSURE OF THE INVENTION

In view of the foregoing, it is an object of the present invention to provide an enhanced CDMA coverage system that minimizes the requirements of handoffs and that minimizes the detrimental effects of multipath (Rayleigh) fading.

It is an additional object of the present invention to provide a CDMA diversity system that provides continuous urban coverage without adding microcells within the urban serving area.

It is an additional object of the present invention to provide a CDMA system adapted for cellular and PCS applications that improves urban coverage with no hardware modifications to existing base station modulating systems or subscriber systems.

It is an additional object of the present invention to provide a CDMA transmission and reception system that enables a CDMA subscriber station to simultaneously communicate with a plurality of CDMA base stations without additional switching or signaling requirements between the base stations and the mobile telephone switching office (MTSO).

It is an additional object of the present invention to provide a CDMA transmission and reception system that enables a CDMA subscriber station to simultaneously communicate with a plurality of CDMA base stations using a single spreading code for the plurality of CDMA base stations.

These and other objects of the present invention are attained by the present invention, which modifies the timing of signals generated by existing CDMA base stations on the forward channel (base station to subscriber station) so that a subscriber station in an urban environment receives a plurality of non-interfering, time-resolvable, CDMA signals from the respective base stations. In addition, the present invention provides a spatial diversity arrangement on the reverse channel (subscriber station to base station) to supply the subscriber station CDMA signal from a plurality of antenna locations, to at least one base station demodulating system, the base station demodulation system including a self-synchronizing diversity combiner means that outputs an integrated reverse-channel data signal to the switching office.

According to the present invention, a voice/data signal for transmission on a CDMA forward channel is supplied to a plurality of base station transceivers. Each of the base station transceivers have a corresponding delay assigned within the range of a resolvable delay, also referred to as a multipath delay factor, and a search interval of the subscriber station demodulator. In other words, the plurality of base station transceivers provide time-delay diversity to a subscriber station in an urban environment by outputting respective CDMA signals having sufficient delay to avoid mutual interference otherwise caused by multipath or Rayleigh interference. At the same time, the time-delay diversity is less than the base station sequence offset that is used to distinguish base stations in a CDMA system. From the perspective of the subscriber station, the time-delay diversity is within the search interval of the subscriber station demodulator, also referred to as the delay spread of the subscriber station demodulator, such that a rake receiver within the subscriber station demodulator can capture the different time-delayed diversity signals using a single PN code sequence.

In addition, the plurality of base station transceivers each receive on the reverse channel the subscriber station CDMA signal at corresponding signal strengths. The CDMA reverse-channel signals received by the base station transceivers are despread using the same PN code sequence. The demodulated signal is output to a diversity combiner, which either selects the demodulated signal from the base station transceiver receiving the strongest reverse-channel CDMA signal, or combines all the demodulated signals to obtain a combined subscriber signal.

In one specific aspect of the present invention, the CDMA system of the present invention provides an arrangement (apparatus and method) for providing time-delay diversity to a forward-channel data signal for transmission to a CDMA subscriber station in an urban environment by supplying the forward-channel data signal to a plurality of base stations, whereby each of the base stations have identical spreading code sequences and different synchronization delays. The synchronization delay of each base station is designed to prevent multipath fading between other base stations and is greater than one chip interval and less than the base station sequence offset. Since the synchronization delays are insignificant with respect to the forward-channel data signal, the plurality of base stations output the identical spread-spectrum signal to the subscriber station at time-delayed intervals corresponding to the respective synchronization delays. Thus, the subscriber station receives the plurality of spread-spectrum signals each carrying the forward-channel data signal, with no multipath fading between the spread-spectrum signals from the different base stations.

In addition, each of the base stations that receive a spread-spectrum reverse-channel signal from the subscriber station despread and demodulate the spread-spectrum reverse-channel signal to recover a corresponding reverse-channel data signal. Each of the base stations recovering a corresponding reverse-channel data signal output the same to a self-synchronizing diversity combiner, which either selects the recovered signal corresponding to the strongest spread-spectrum reverse-channel signal, or combines the recovered signals from the respective base stations to provide an integrated reverse-channel data signal for transmission to the switching office.

In another specific aspect of the present invention, the CDMA system of the present invention provides an arrangement (apparatus and method) for providing time-delay diversity to a forward-channel data signal for transmission to a CDMA subscriber station by supplying the forward-channel data signal to a CDMA base station for transmission, whereby the CDMA base station outputs a spread-spectrum forward channel signal to a plurality of antennas, each antenna having an antenna synchronization delay designed to prevent multipath fading between other antennas of the base station, whereby the antenna synchronization delay is greater than one chip interval and less than the a maximum delay window corresponding to the base station sequence offset. The subscriber station receives the spread-spectrum forward channel signal from the different antennas at time-delayed intervals corresponding to the respective antenna synchronization delays. Thus, the subscriber station receives the plurality of spread-spectrum signals each carrying the forward-channel data signal, with no multipath fading between the spread-spectrum signals from the antennas of the base station.

In addition, each antenna of the base station that receives a spread-spectrum reverse-channel signal from the subscriber station supplies the received spread-spectrum reverse-channel signal to the base station, which includes a rake receiver to despread and demodulate the received spread-spectrum reverse-channel signals.

Thus, the present invention provides an apparatus and method for transmitting forward channel data to a subscriber from spatially diverse sources, each of which have associated delays to provide synchronization diversity, resulting in improved coverage in urban areas with minimal multipath fading.

These and other objects of the present invention will become more readily apparent upon the following description of the disclosed embodiment and the appended claims.

BRIEF DESCRIPTION OF DRAWINGS

Reference is made to the attached drawings, wherein elements having the same reference numeral designations represent like elements throughout, and wherein.

BEST MODE FOR CARRYING OUT THE INVENTION

The present invention provides a combination of spatial diversity and time-delay diversity in order to provide adequate cell coverage in an urban environment, whereby the additional coverage does not introduce additional multipath fading. By providing an adequate time delay between the CDMA signals output by spatially-distributed antennas, the present invention enables a subscriber station, also referred to as a personal station, to receive the CDMA forward channel signals from the respective antennas at time intervals sufficient to avoid multipath fading between the antennas. Thus, a subscriber station receiving the different CDMA signals perceives the transmitted signals as identical transmitted signals having a sufficient multipath delay between the transmitted signals such that each of these signals may be demodulated and combined by the subscriber station using a rake receiver.

Figure 1:
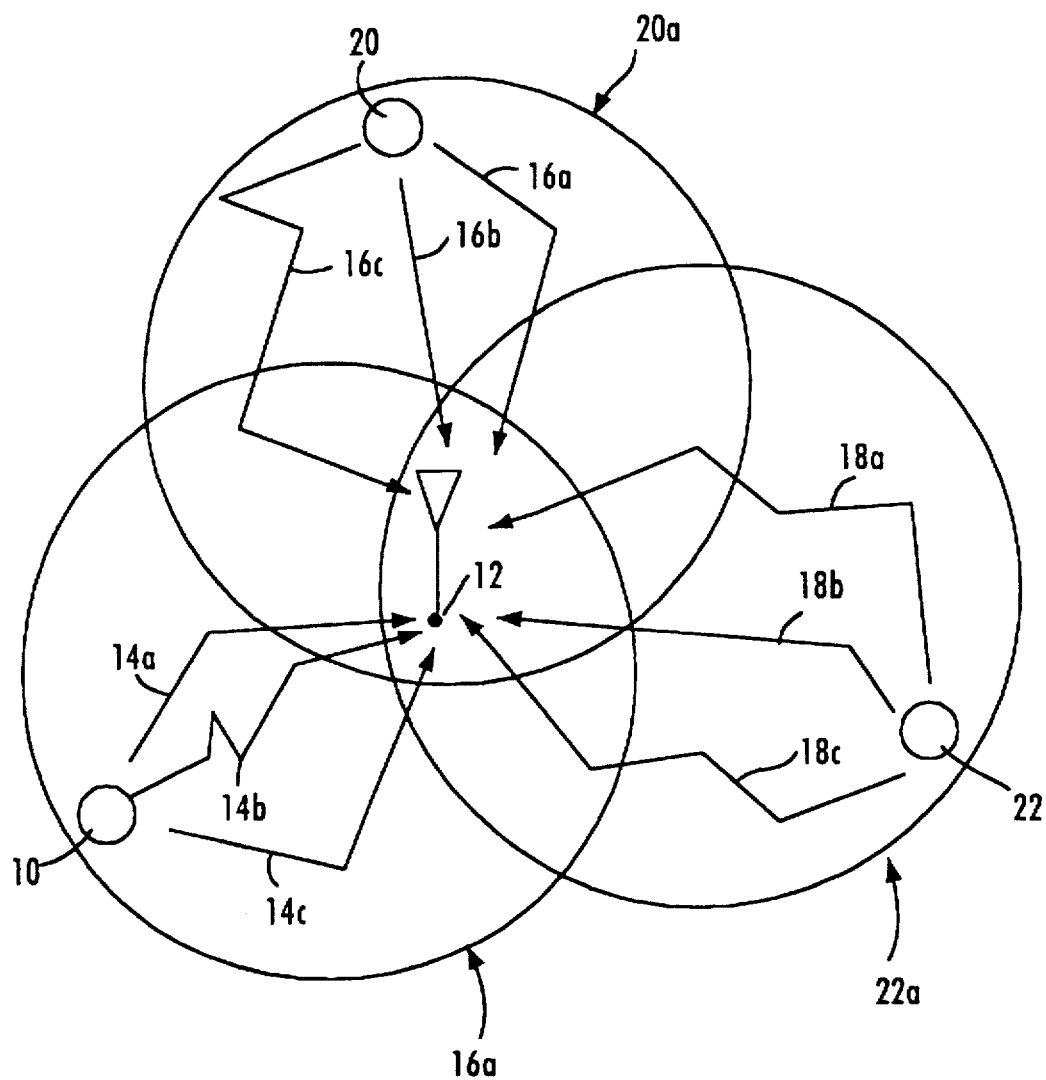
FIG. 1 discloses a conventional (prior art) antenna structure and associated multipath radio signals.
Figure 2:
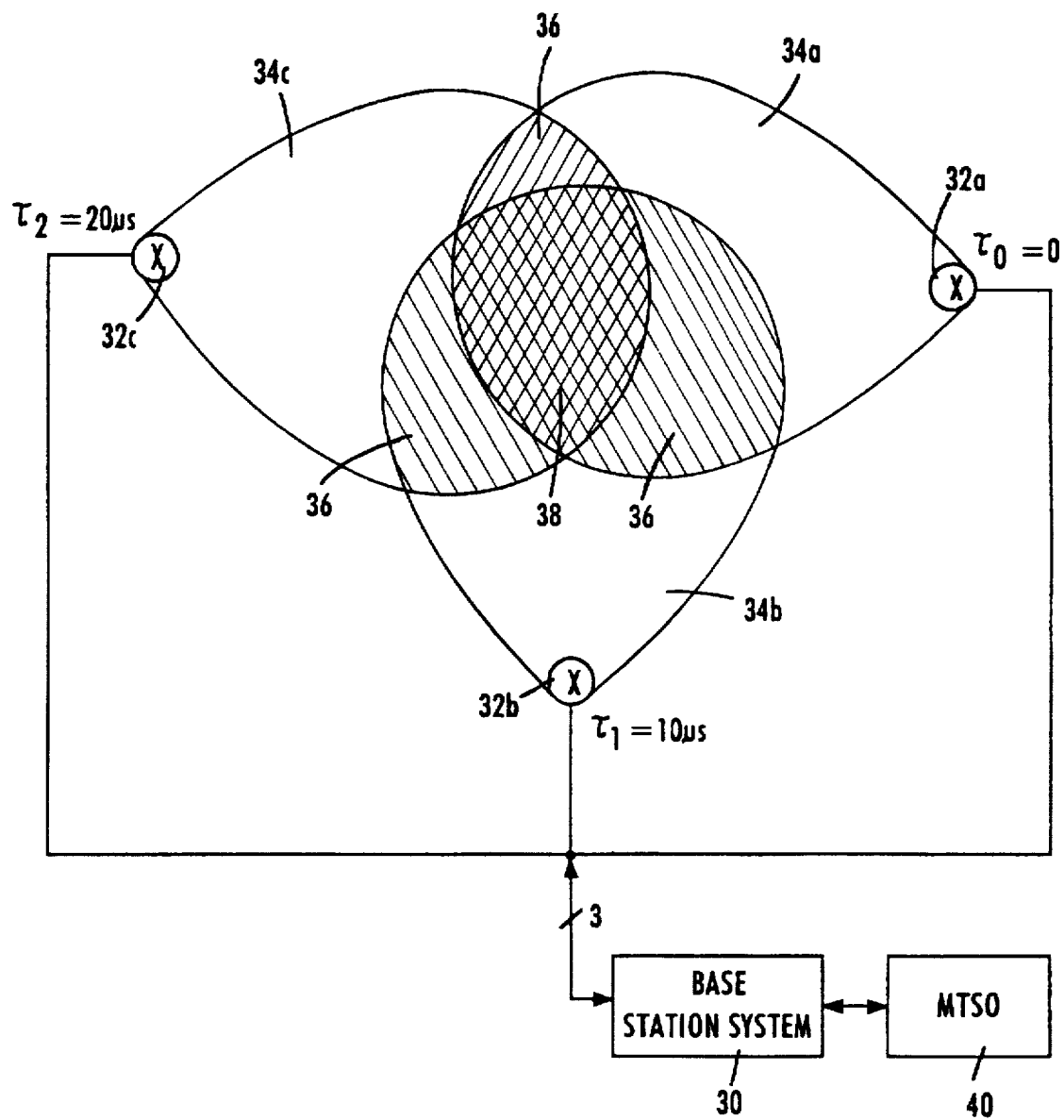
FIG. 2 is an illustration of a distributed antenna structure using a time-delay arrangement on the CDMA forward channel according to the present invention.

As shown in FIG. 2, the present invention provides a base station system 30 and a plurality of antennas 32. Each of the antennas 32 have a corresponding transmission area 34. As shown in FIG. 2, each of the transmission regions 34a, 34b and 34c overlap to form coverage regions 36 and 38, whereby regions 36 have dual coverage (by two base station antennas 32), and region 38 has coverage by all three base station antennas 32a, 32b and 32c. Thus, the coverage region 38 preferably corresponds to covering a downtown urban area having the greatest potential for shadowing due to complex building structures. Although FIG. 2 shows only three antennas 32a, 32b and 32c, in actual implementation there may exist as few as two or twelve or more antennas surrounding an urban region in order to provide comprehensive coverage to minimize shadowing in the particular region.

In addition, each of the base station antennas 32 have a corresponding associated time delay. For example, the antenna 32a has a time delay of 0 ($t_0$=0 µs), representing no delay from the base station system 30. Antenna 32b has an associated delay of 10 microseconds ($t_1$=10 µs) relative to antenna 32a, and base station antenna 32c has a delay of 20 microseconds ($t_2$=20 µs) relative to antenna 32a. Thus, the antenna structure 32 is provided with associated delays so that the output signals do not introduce additional multipath fading with the corresponding signals output from the different antenna structures in the overlapping regions 36 and 38. In an urban environment, a delay of three microseconds between antenna sources should be sufficient to avoid multipath delays; thus, if the antenna arrangement 32 includes twelve antennas surrounding an urban region, each antenna would have a corresponding delay of 3.3 microseconds, assuming a subscriber spread delay window of 40 µs (described in detail below).

As shown in FIG. 2, the antenna structure 32 receives the CDMA signals for modulation from the base station system 30. The base station system 30 comprises the base station CDMA modulation system, and the delay circuitry associated with each of the antennas 32. A more detailed discussion of the base station system 30 is given below with references to FIGS. 3, 5 and 6.

According to the preferred embodiment, the base station system 30 performs code division multiple access (CDMA) processing of voice and data signals received from a mobile telephone switching office (MTSO) 40. The CDMA processing performed by the base station system 30 is performed in accordance with the well-recognized standard IS-95, incorporated herein in its entirety by reference. In addition, the base station system 30 is adapted for performing CDMA for personal communications systems (PCS) in accordance with proposed standard PN-3384, incorporated herein by reference.

As described in detail below, the present invention provides delay circuitry such that the antennas 32 output identical CDMA-modulated signals at corresponding delay intervals. The delay intervals are based upon the capability of the rake receiver in the subscriber station to identify a CDMA-modulated signal as being transmitted from a particular base station. For example, according to IS-95, each base station of a cellular system has a unique spreading code defined in part by an assigned base station sequence offset. A subscriber station having a rake receiver is assigned a search interval corresponding to the base station sequence offset. If the signal paths that are received by the subscriber station come in over the different multipaths within the rake receiver search window, typically 30 to 40 microseconds, the rake receiver of the subscriber station can sort out the multipath signals that have adequate separation. If, on the other hand, the delay intervals are too small, i.e., less than the chip duration, then the multipaths are not resolvable, resulting in Rayleigh fading. Alternatively, if the delays are too large, i.e., greater than the base station sequence offset, then the delayed signals are perceived by the subscriber station as coming from another base station having a different spreading code, requiring the subscriber station to shift its stored code sequence. Thus, from the perspective of the base station, the range of delay is greater than the chip interval, also referred to as the chip duration, and less than the base station sequence offset; from the perspective of the subscriber station, the range of delay is greater than the chip interval and less than the maximum search interval of the subscriber station. According to Sec. 3.2.2 of the proposed CDMA PCS standard (PN-3384), in a typical system the subscriber station uses a search interval, also referred to as search window, having sizes of 30–40 µs.

A brief overview of CDMA processing will now be described, followed by a more detailed description of the preferred embodiment.

In a base station performing forward channel processing, the forward CDMA Channel signal is BPSK modulated and QPSK spread. The detection on the Forward CDMA Channel by a subscriber station receiver is coherent. In a subscriber station, however, the reverse CDMA Channel signal uses a combined Walsh and BPSK modulation followed by QPSK spreading. This signal is detected non-coherently.

The CDMA PCS system forward channel waveform uses a combination of frequency division, pseudo-random code division, and orthogonal signal multiple access techniques. Frequency division is employed by dividing the available spectrum into nominal 1.25 MHz bandwidth channels.

On a given CDMA Channel, all base stations transmit on the same frequency. Pseudo-random noise (PN) binary codes are used to distinguish between the signals from different base stations. For example, each base station stores a reference code, and begins use of the reference code sequence at a different sequence location in accordance with the corresponding base station sequence offset, also referred to as a time shift, in order to obtain a unique code. Generally, each base station or sector of a base station (if sectorized) transmits the same code at 26.667 millisecond intervals ($2^{15}$ chips). Since the correlation of the code with a time shifted version results in a small random number relative to the peak correlation (unshifted version) when the average is done over many chips, signals from other base stations appear as noise. Time shifts are assigned to base stations in a manner such that the code from one base station and the code from another base station, having a different time shift, do not overlap at any place within range of the two base stations.

Two PN sequences are generated, one for each of two quadrature carriers, resulting in quadriphase PN modulation. For example, for a transmission rate of 9600 bps, the PN chip rate is 1.2288 Mcps, or 128 times the transmission rate. Each PN sequence is a maximal length sequence of length $2^{15}-1$ augmented with a 0 to obtain a sequence of length 32768.

The signals are band limited by the digital filter that provides a sharp frequency roll-off, resulting in a nearly square spectral shape that is 1.23 MHz wide at the 3 dB point. All signals transmitted from a single antenna on a particular CDMA Channel share a common PN code phase. They are distinguished at the personal station by using a binary orthogonal code based on Walsh functions (also known as Hadamard matrices). The Walsh function is 64 PN code chips long and provides up to 64 different orthogonal codes called code channels. Orthogonality provides perfect isolation between the multiple signals transmitted by the base station.

The personal station receives two code channels, the Pilot Channel, described later, and an information bearing code channel (Traffic Channel, Paging Channel, or Sync Channel). Information bits being transmitted on an information bearing code channel are convolutionally encoded to provide forward error correction. The code has a constraint length of nine and a code rate of ¾ for the 1.8, 3.6, 7.2, and 14.4 kbps rates, or ½ for all other rates. The Forward CDMA Channel provides a flexible communication link that can support a variety of data rates.

The CDMA PCS system will support data rates of less or equal than 14400 bps. When transmitting at the full 9600 bps rate, this provides a code symbol rate of 19200 symbols per second (sps). When the base station is transmitting at a lower rate, either 4800, 2400, or 1200 bps the code symbols are repeated to obtain a constant 19200 sps rate. Similarly, when transmitting at the 14400 bps rate, this also provides a code symbol rate of 19200 sps. At lower data rates, 7200, 3600, or 1800 bps. the code symbols are repeated to obtain a constant 19200 sps rate.

In the CDMA PCS system, the code symbols are interleaved and each symbol is covered with the Walsh function resulting in a 1.2288 Mcps stream. This stream is BPSK modulated and covered with the orthogonal pair of PN codes described above. To provide communications privacy, each code channel is scrambled with a user addressed long code PN sequence. Thus, a "channel" on the Forward CDMA Channel of the CDMA PCS system comprises of a signal centered on an assigned frequency, quadriphase modulated by a pair of PN codes with an assigned time offset, biphase modulated by an assigned orthogonal Walsh function, and biphase modulated by the encoded, interleaved, and scrambled digital information signal.

A particular aspect of the Forward CDMA Channel waveform design is the use of the Pilot Channel that is transmitted by each base station. The Pilot Channel is a code channel that is unmodulated by information and is assigned the zero Walsh function (which consists of 64 zeros). Thus, the signal simply consists of a quadrature pair of PN codes. The pilot PN sequence offset is used for identifying each base station. The personal station obtains the first level of synchronization with the nearest base station without prior knowledge of the base station identity by searching all 32768 time shifts ($2^{15}$) of the PN code. For each time shift, the personal station performs a correlation to collect a sufficient amount of energy to detect the signal's presence. The Pilot Channel is also used for time tracking and as a coherent carrier phase reference for demodulating other code channels transmitted by the base station.

Once the personal station acquires the Pilot Channel, it starts demodulating the synchronization channel (Sync Channel). The synchronization channel framing is time aligned with the pilot PN code, uses a preassigned Walsh function, and conveys time-of-day and the time offset of the pilot PN code for the base station relative to true time. This allows the personal station to move its timing from that aligned with the pilot PN code to the true time. The true time is the same for all base stations. Once time has been adjusted, the personal station receives one of the paging channels which conveys other system information, pages, and responses to accesses.

Typical channels available for output by a base station for the CDMA PCS system includes: the pilot channel (Walsh symbol 0), the sync channel (Walsh symbol 32), paging channels 1–7 (Walsh symbols 1–7), and traffic channels 1–55 (Walsh symbols 8–63). Thus, out of the 63 code channels available for use, the base station uses seven paging channels (the maximum number allowed), one synchronization channel, and 55 traffic channels. Other possible configurations could replace the synchronization channel and paging channels one for one with traffic channels, allowing up to 63 traffic channels.

Figure 3:
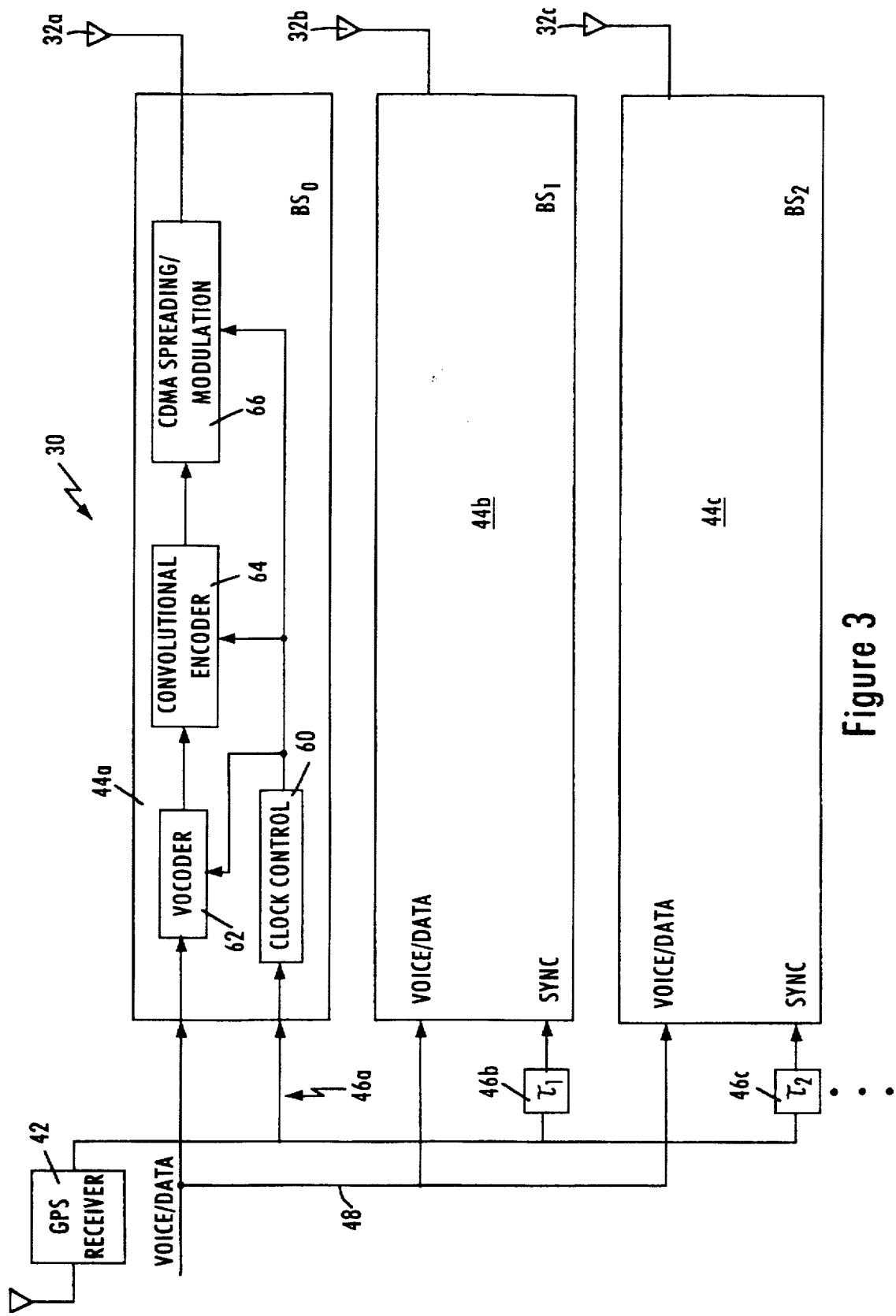
FIG. 3 is a block diagram illustrating a base station arrangement comprising a series of base stations having corresponding synchronization delays for forward channel transmission according to a preferred embodiment of the present invention.

FIG. 3 discloses a block diagram illustrating a base station arrangement for providing synchronization delays for forward channel transmission according to a preferred embodiment of the present invention. As shown in FIG. 3, the base station system 30 comprises a GPS receiver 42, a plurality of CDMA base stations 44, and delay devices 46 for providing corresponding synchronization delays to the respective base stations 44. As shown in FIG. 3, the GPS receiver receives satellite signals from the GPS satellite system in order to provide a synchronized GPS time scale as the system clock for the CDMA system. The GPS receiver 42 outputs the system clock to the base stations 44.

As shown in FIG. 3, each of the base stations 44 have an associated delay device 46 which provides a corresponding synchronization delay for forward channel transmission. For example, base station 0 ($BS_0$) 44a receives a direct input from the GPS receiver 42, so that the associated delay device 46a is effectively equal to zero ($t_o$=0). The base station 1 ($BS_1$) 44b, however, has an associated delay device 46b ($t_1$=10 microseconds), such that the sync input to the base station 1 ($BS_1$) 44b receives the system clock signal at a delayed interval corresponding to the delay device 46b (e.g., 10 microseconds). Similarly, the base station ($BS_2$) 44c has an associated delay device 46c that provides a corresponding delayed system clock to the sync input of the base station (e.g., 20 microseconds). Thus, each of the base stations 44a, 44b and 44c receive the system clock at different times corresponding to the synchronization delay provided by the corresponding delay device 46.

In all other aspects, each of the base stations 44 are identical, namely each receive the voice/data signal from the MTSO, and each of the base stations 44 are assigned the identical pilot PN sequence offset used to identify different base stations within a cellular system. Thus, each of the base stations 44 output the identical spread spectrum CDMA signals to the respective antennas, the only difference being that each of the antennas outputs the corresponding spread spectrum CDMA signal at a successive time interval corresponding to the synchronization delay of the respective forward channel transmission. The timing relationship between the base stations 44a, 44b, and 44c is shown in FIG. 4.

Figure 4:
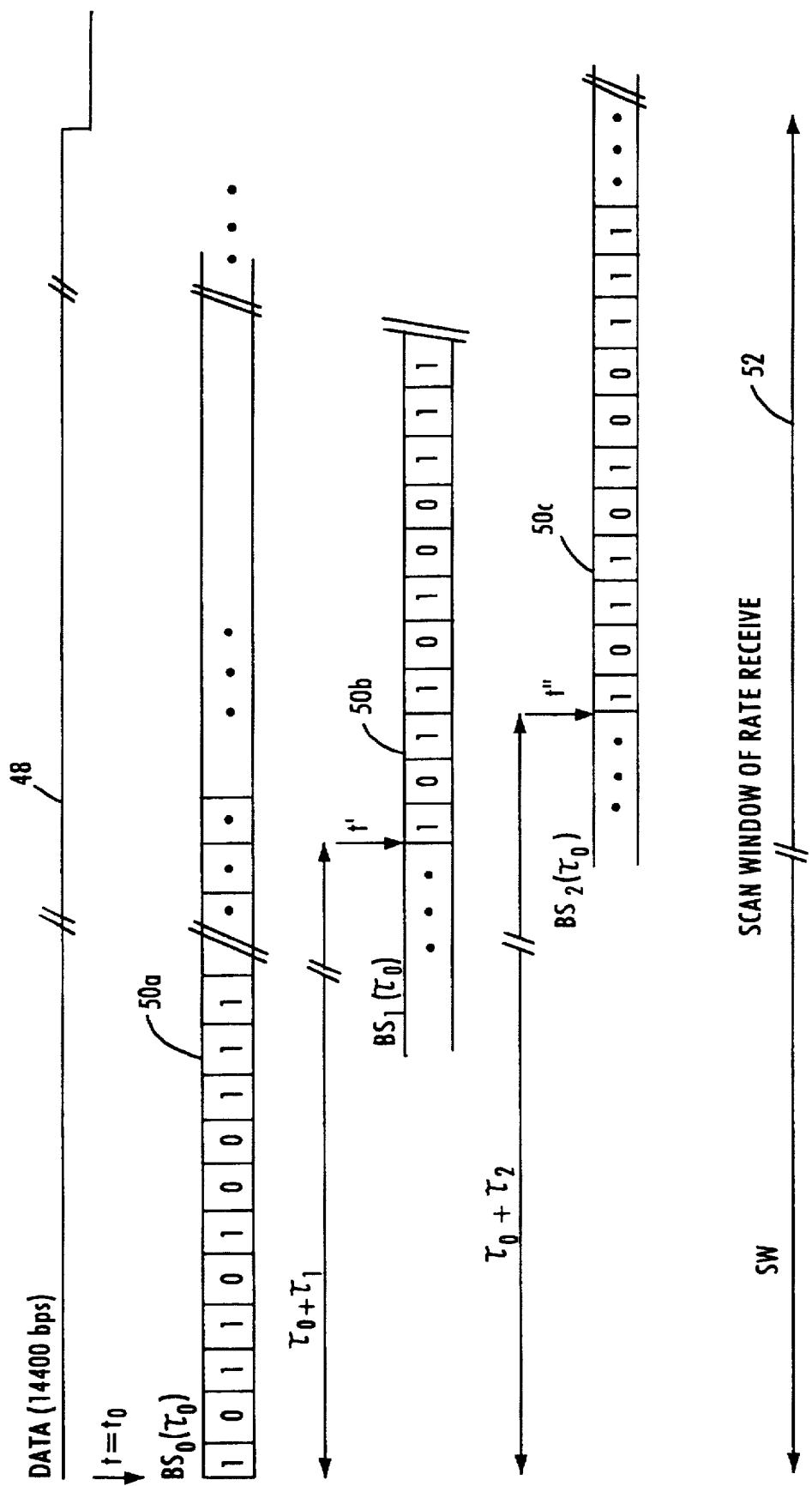
FIG. 4 discloses a timing sequence illustrating the operation of the base stations shown in FIG. 3.

FIG. 4 illustrates a timing diagram of the code sequences generated by the respective base stations 44 shown in FIG. 3. As shown in FIG. 4, each of the base stations receive a voice or data signal 48 which may have a data rate, for example, of 14400 bps, having a signal duration of 69 μs. Alternatively, the data signal 48 may represent an analog voice signal or PCM encoded voice data. Reference numeral 50a refers to the pilot PN code for the base station 0 ($BS_0$) 44a having a sequence beginning at time $t=t_0$. The pilot PN code 50a corresponding to the base station 0 ($BS_0$) is generated in accordance with the specifications of IS-95, namely, that the PN code sequence is generated in accordance with a pilot PN sequence offset assigned to the base station 44a. After a time interval $t_1$ specified by the delay device 46b, the base station 1 ($BS_1$) 44b begins generating a pilot PN code 50b identical to the code 50a, but offset in time by the delay interval $t_1$ by the delay device 46b. Thus, whereas base station 44a begins generating the pilot PN code sequence 50a at time $t=t_0$, the base station 44b begins generating the same pilot PN code sequence at time $t=t_0+t_1$. From the perspective of the base station 1 (BS$_1$) 44b, it has begun generating the pilot PN code within its internal clock control registers at its time $t'=t_0$, whereby $t'=t+t_1$.

Similarly, at time $t=t_0+t_2$, the base station 2 (BS$_2$) 44c begins outputting the identical pilot PN code sequence 50c, but offset in time by the delay interval $t_2$ corresponding to the delay device 46c. From the perspective of the base station 2 (BS$_2$) 44c, the pilot PN code is generated at time $t''=t_0$, whereby $t''=t+t_2$. Thus, as shown in FIG. 4, each of the base stations 44a, 44b and 44c have the identical pilot PN sequence offset used to identify base stations. However, each of the base stations 44a, 44b and 44c receive system clock signals from corresponding delay devices that affect the local clock of the base station with respect to the system clock established by the GPS receiver 42. As shown in FIG. 4, despite the delays added to each of the corresponding base stations 44, the delays are insignificant with respect to the data signal 48. In addition, the overall delays are well within the scan window 52 of the rake receiver in the subscriber station, which is typically in the range of 30 to 40 microseconds. Thus, from the perspective of the subscriber station, the pilot signals 50a, 50b and 50C are perceived as being transmitted from the same base station having a specified pilot PN sequence offset, except that the different pilot signals have different multipath delays which may be demodulated by the rake receiver in the subscriber station.

As shown in FIG. 3, each of the base stations 44a comprise the necessary components to compress and perform CDMA modulation of the voice or data signal 48 from the MTSO. Specifically, each of the base stations 44 comprise a clock control circuit 60, which performs time tracking loop functions and time synchronization functions in response to the received system clock signal supplied by the delay device 46 to the sync input of the base station 44. A more detailed description of the necessary synchronization for the clock control circuit 60 is found in IS-95 and PN-3384, the disclosures of which are incorporated herein by reference.

The base station 44 receives the voice/data signal and latches the signal internally in accordance with clocking signals generated by the clock control circuit. The base station 44 includes a vocoder that performs any necessary voice compression using linear predictive coding, such as code excited linear prediction (CELP), described in detail in the above-identified standards. If the supplied signal 48 is a data signal, the functions of the vocoder 62 may be bypassed.

The vocoder 62 outputs a compressed signal to the convolutional encoder 64, which performs error encoding functions such as forward error correction, frame error detection, and message error detection. A cyclic redundancy check (CRC) word is also generated for each message. A more detailed description of encoding techniques is found in Section 2.1.3 of IS-95, incorporated herein by reference. The encoded signal is output from the convolutional encoder 64 and supplied to the CDMA spreading/modulation circuit 66.

The CDMA spreading/modulation circuit 66 performs all CDMA processing and all RF modulation necessary to output a CDMA spread-spectrum signal to the antenna 32 in accordance with the specifications of IS-95 and PN-3384. For example, the CDMA spreading/modulation circuit may include a long code generator, synchronized to the clock control 60, for generating a 1.2288 Mcps long code mask for a user. After passing through a decimater, the long code will be combined with a modulation symbol (19.2 ksps) that has gone through puncturing, and block interleaving. The resulting signal will be covered with a Walsh function, and then the resulting signal will be spread by I-channel and Q-channel pilot PN sequences (1.2288 Mcps), after which the resulting signals are passed through a base band filter and modulated to a predetermined carrier frequency.

As shown above, each of the base stations 44 receive voice/data signals and corresponding synchronization signals to control the CDMA modulation to provide adequate coverage within the serving area shown in FIG. 2. Since all modifications to the base station system 30 are external to the individual base stations 44, the preferred embodiment shown in FIG. 3 may be easily implemented without any modifications to the individual base station components. Rather, all modifications are external to the base station circuitry.

In addition, no modification is needed for the subscriber stations used in the areas served by the disclosed embodiment. As discussed earlier, subscriber stations that are designed in compliance with IS-95 and PN-3384 are able to receive the multipath signals from the separate base stations 44a, 44b and 44c simultaneously using a conventional rake receiver to reconcile the multipath delays. Additional details for the specifications of the subscriber station functionality and the rake receiver can be found in IS-95, PN-3384, and U.S. Pat. No. 5,109,390 to Gilhousen et al., the disclosures of which are incorporated in their entirety by reference.

As discussed above, the voice/data signals are latched into the base stations in accordance with the respective internal clock signals. Thus, since the voice/data signals are latched at different times due to the synchronization delays, there may be some loss of synchronization between the respective voice signals. As discussed above with respect to FIG. 4, the delays are insignificant relative to the duration of the voice/data signal. Therefore, any degradation in performance caused by loss of synchronization between the respective voice signals is insignificant relative to the gains by minimizing multipath fading according to the present invention.

Figure 5:
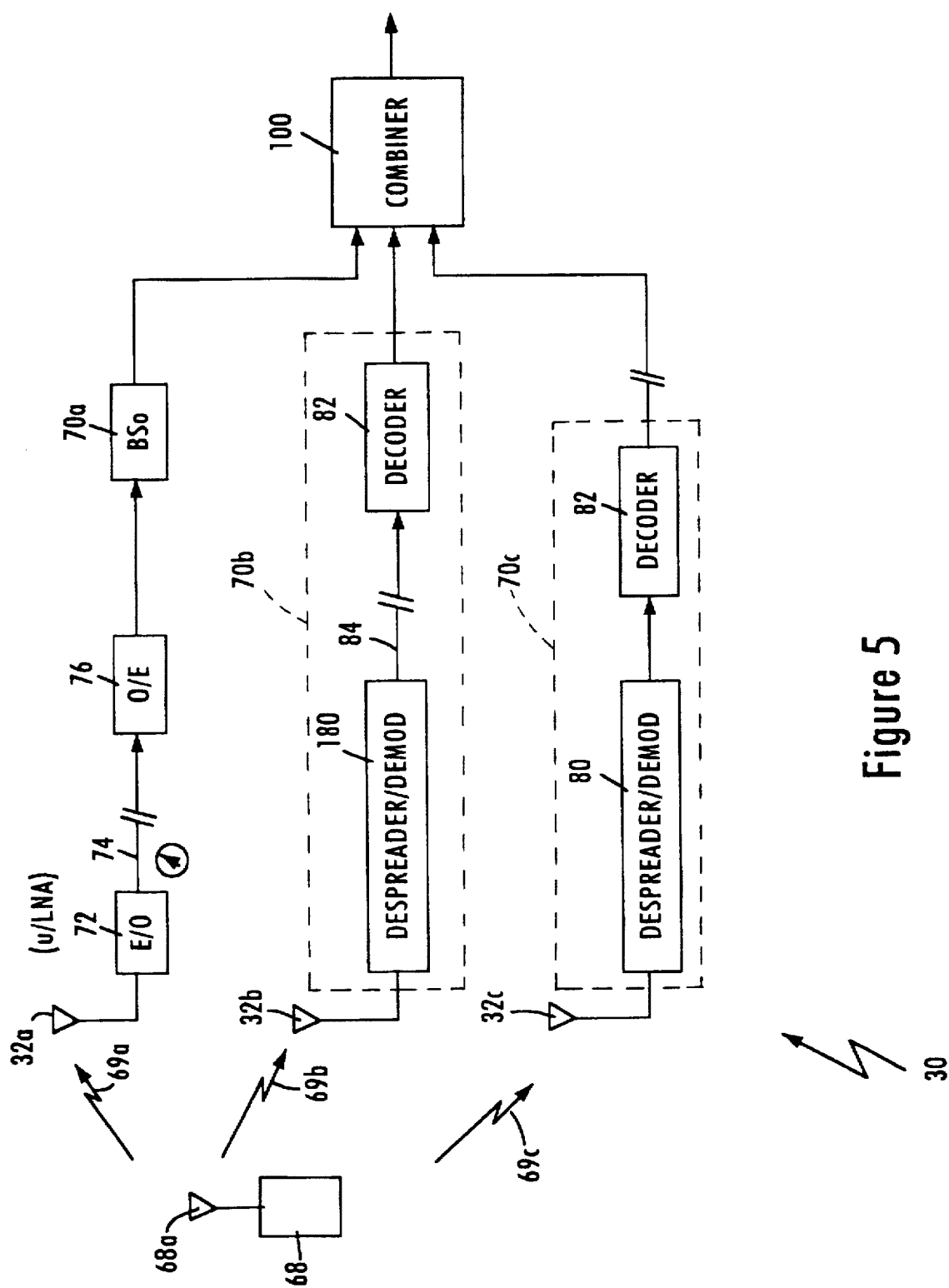
FIG. 5 illustrates a block diagram showing a base station according to a preferred embodiment of the present invention for the reverse channel.

FIG. 5 discloses an exemplary arrangement of the base station system 30 from the perspective of the reverse channel. As shown in FIG. 5, a subscriber station 68, also referred to as a personal station, outputs a CDMA-modulated reverse channel signal 69 via an antenna 68a. Due to the urban environment, the reverse channel signal undergoes a plurality of reflections in the urban environment such that the distributed antennas receive corresponding signal paths 69. Each of the antennas 32 comprise a low-noise amplifier, which amplifies and outputs the received CDMA signal to a base station 70 to recover the reverse channel data signal from the subscriber station 68. As shown in FIG. 5, alternative implementations of the base station 70 are available, depending on the desired network arrangement and antenna topology. For example, antenna 32a supplies the received signal to an electrical to optical converter 72, which outputs the received reverse path signal 69a on an optical fiber 74 for transport to a different geographic location. The optical fiber is terminated by an optical to electrical converter 76, which reconverts the supplied signal to an electrical RF signal for demodulation by the base station 70a. The base station 70a recovers the reverse channel data signal as specified in IS-95 and PN-3384, the disclosures of which are incorporated herein by reference. The reverse channel data signals from the corresponding base stations 70a, 70b and 70c are supplied to a self-synchronizing diversity combiner 100 to obtain an integrated reverse channel data signal to be supplied to the public switched telephone network.

In a variation of the above-described base station 70a, the base station 70b may split the components of the base station at two geographic locations. For example, in base station 70b, the received reverse channel CDMA signal 69b is despread and demodulated by the despreader/demodulation circuit 80, which outputs an encoded, interleaved data signal having, for example, a data rate of 28.8 kilosymbols per second (ksps). The data signal is supplied via a T1 trunk line 84 to a decoder 82 at a central location. After all decoding and error corrections functions have been performed by the decoder 82 in accordance with IS-95, the reverse channel data signal is output by the base station 70b to the combiner 100.

Alternately, as shown with respect to base station 70c, the entire base station equipment may be located at the remote site adjacent to the antenna 32c, such that the reverse channel data signal is output from the base station 70c and transported to the combiner 100.

As suggested above, the combiner 100 performs diversity combining of the received reverse channel data signals in order to obtain an integrated reverse channel data signal. The combiner 100 performs the diversity combining in accordance with IS-95 and PN-3384, incorporated herein by reference. Additional examples of such combiners are known in the art. For example, U.S. Pat. No. 5,109,390 to Gilhousen et al. disclose a diversity combiner and decoder 80 for combining data signals received from a plurality of antenna sources, incorporated herein by reference.

It should be noted that the base stations 70a, 70b and 70c correspond to the base stations 44a, 44b, 44c, respectively, and may share common hardware for forward and reverse channel functions, respectively. Thus, even though the base stations 70a, 70b and 70c may have corresponding delay devices for use on the forward channel, any delays are reconciled during link acquisition on the reverse channel, as specified under IS-95. Thus, the use of synchronization delay on the forward channel does not adversely affect reverse channel synchronization. Further, any multipath delays associated with, or between, paths 69a, 69b and 69c are reconciled by the corresponding base stations 70a, 70b 1and 70c during reverse link acquisition.

Figure 6:
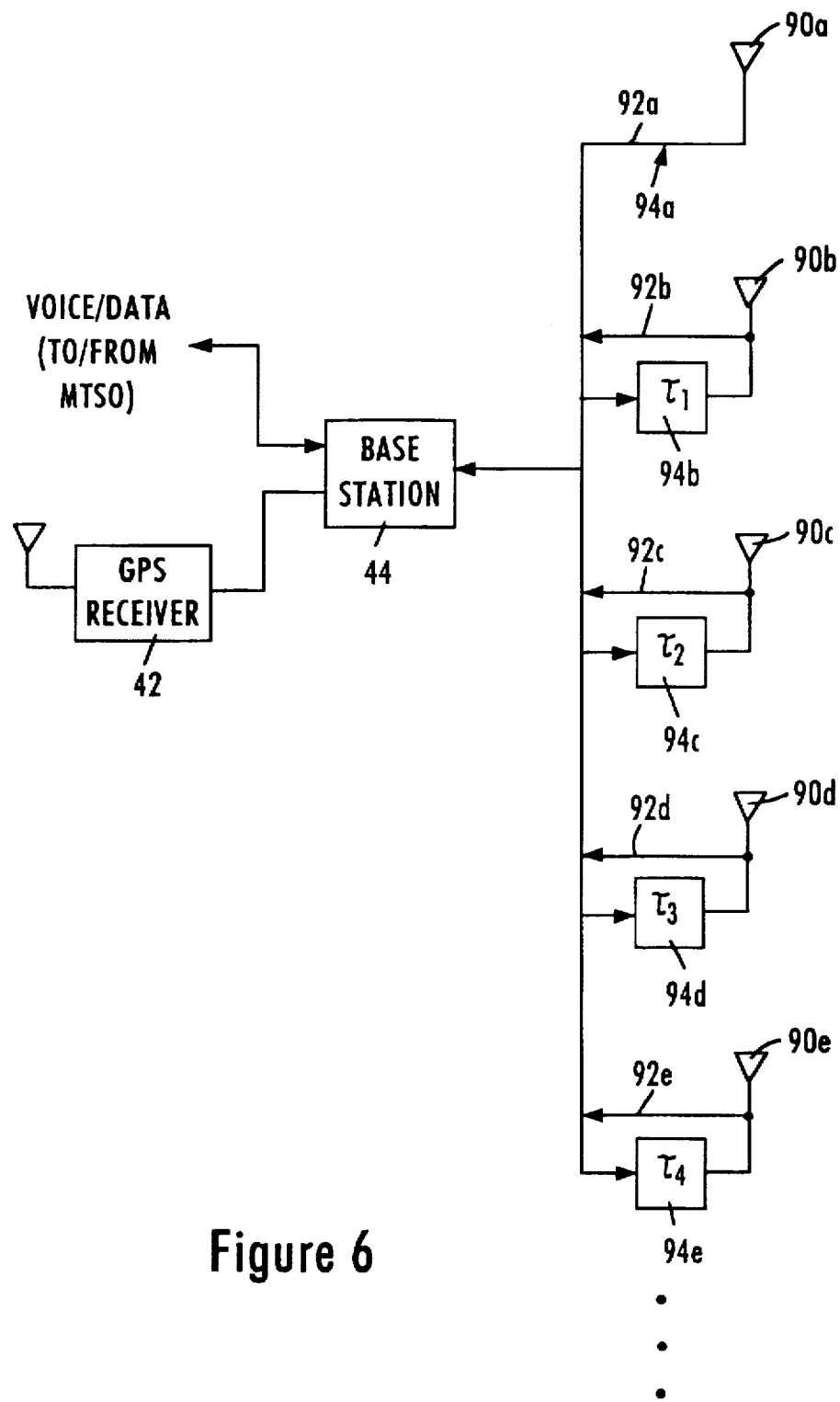
FIG. 6 discloses an alternative embodiment for implementing time-delay diversity according to the present invention.

FIG. 6 discloses an alternative embodiment of the base station system 30 disclosed in FIG. 2. As shown in FIG. 3, the alternate implementation of the base station system 30 comprises a GPS receiver 42, a single base station 44 for serving the urban area, and an antenna array 90 receiving forward and reverse channel CDMA signals. As shown in FIG. 6, the antenna array comprises a series of antennas 90a, 90b, 90c, 90d and 90e. Each of the antennas 90 have a direct feed to the base station 44 on the reverse channel via signal feeds 92. However, on the forward channel, each of the antennas have an associated delay 94. Antenna 90a has a zero delay 94a, and as such serves as the reference antenna ($t_0$=0). Antenna 90b has an associated delay 94b ($t_1$) equal to, for example, 10 microseconds. The antenna 90c has an associated delay 94c equal $t_0$, for example, $t_2$=20 microseconds. Antenna 90d has an associated delay 94d equal to, for example, $t_3$=30 microseconds. Finally, antenna 90e has an associated delay 94e equal to, for example, $t_4$=5 microseconds. Thus, the implementation in FIG. 6 shows that the base station 44 outputs identical CDMA modulated signals on the forward channel, except that each antenna 90 outputs the identical signal at a different time interval corresponding to the antenna delay associated with the corresponding antenna. When distributed to transmit the forward channel CDMA signal within a serving area as shown in FIG. 2, the antenna array 90 provides sufficient self coverage in an urban environment, without adding additional multipath fading problems between the respective antennas.

The delay device 94 may be implemented, for example, by providing different length cable to supply the CDMA signal from the base station 44 to the corresponding antenna. For example, for coaxial cable, a delay of 1 chip rate (813.802 nanoseconds) may be obtained using an additional length of coaxial cable equal to 244 meters. Similarly, a 3 microsecond delay may be added by installing an additional 900 meters of cable relative to the reference antenna 90a. Finally, 10 microseconds delay may be added to that antenna by providing an additional 3 kilometers of cable. Thus, it will be appreciated that the alternative embodiment disclosed in FIG. 6 may be implemented by placing the reference antenna 90a at the closest geographic location to the base station 44, with the antennas having the greatest delay being located the furthest distance from the base station 44.

In actual implementation, however, the delay elements 94 are analog delay devices, as known in the art, which have corresponding device delays. Thus, the delay elements 94, when used in combination with known lengths of cable having known propagation delays, can provide the necessary antenna delay ($t_i$).

As will be appreciated in the art, the coaxial cables used in the discussion with respect to the embodiment of FIG. 6 may be replaced with optical fibers, although variations may exist due to the different propagation speeds of the optical signals through the optical fiber.

As disclosed above, the disclosed arrangement of providing spatial and time diversity is particularly effective in the urban downtown region as shown in FIG. 2. It will be appreciated that the disclosed arrangement can be used with conventional cellular (honeycomb) arrangements that serve areas that do not experience such severe multipath and shadowing effects, for example, suburban areas.

As shown above, the present invention enables a plurality of base stations or antenna systems to simultaneously transmit identical CDMA signals to a subscriber station without introducing multipath fading, by adding an appropriate delay to each of the base station sequences or the antenna delays. In view of the foregoing, it will be appreciated that various modifications and variations may be made. For example, the specified duration of the chip rate may be varied, depending upon the specific technology being implemented. In addition, the scan window duration for a subscriber station may be modified to accommodate different time durations. In view of such modifications, the teachings of the present invention may still be practiced by maintaining delayed differentials greater than the established chip rate, and preferably greater than the nominal Rayleigh delayed factor, typically 2 to 3 microseconds, and less than the scan window of the rake receiver in the subscriber station, typically 30–40 microseconds.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. In a communications system providing wireless communications services to a plurality of subscriber stations in an urban serving area, the communications system comprising at least one base station outputting a spread spectrum signal generated in response to a subscriber information signal and an assigned code sequence having a predetermined chip interval, and a plurality of antennas spatially distributed around said urban serving area, a method for providing spread spectrum-processed information signals to said urban serving area comprising the steps of:

supplying the subscriber information signal to the at least one base station;

supplying a synchronization signal to said at least one base station, said synchronization signal corresponding to a system clock;

providing to said antennas corresponding spread spectrum signals from said at least one base station, each of said spread spectrum signals received by said corresponding antenna having a corresponding transmission delay relative to the other spread spectrum signals, said corresponding transmission delay being greater than said chip interval and less than a search interval of said subscriber stations; and transmitting the spread spectrum signals from the respective antennas into the urban serving area to form overlapping coverage regions that minimize shadowing effects.

2. A method as recited in claim 1, wherein said transmission delay is within a range greater than one microsecond and less than forty microseconds.

3. A method as recited in claim 2, wherein said transmission delay is substantially equal to three microseconds.

4. A method as recited in claim 3, wherein said providing step comprises the step of:

(a) generating within said at least one base station a first spread spectrum signal in response to said synchronization signal and in accordance with said assigned code sequence;

(b) supplying said first spread spectrum signal to a plurality of transmission paths corresponding to said antennas, each of said transmission paths comprising said corresponding transmission delay, said transmission paths supplying said spread spectrum signals to said antennas, respectively.

5. A method as recited in claim 4, wherein said providing step further comprises the steps of:

inputting said first spread spectrum signal supplied on said transmission paths into delay devices having predetermined device delays, respectively;

outputting the spread spectrum signals from said delay devices to said antennas, respectively.

6. A method as recited in claim 5, wherein said transmission delays of said transmission paths comprise said predetermined device delays and propagation delays of said transmission paths, respectively.

7. A method as recited in claim 3, wherein said providing step comprises the steps of:

assigning a plurality of base stations with an identical code sequence offset defining an identical code sequence for each of said base stations, said plurality of base stations including said at least one base station;

supplying said synchronization signal to a plurality of delay devices having separate synchronization delays corresponding to said transmission delays, respectively;

outputting delayed synchronization signals from said delay devices to said base stations, respectively; and outputting said spread spectrum signals from said base stations at time intervals corresponding to said synchronization delays, respectively, said spread spectrum signals being identical.

8. A method as recited in claim 7, wherein each of said synchronization delays have delay values corresponding to said search interval divided by the number of said antennas.

9. A method as recited in claim 7, wherein said providing step further comprises the step of outputting said spread spectrum signals from said base stations to said antennas, respectively.

10. A method as recited in claim 9, further comprising the step of installing each of said base stations at locations corresponding said antennas, respectively.

11. A method as recited in claim 3, further comprising the step of installing each of said base stations at locations corresponding said antennas, respectively.

12. A method as recited in claim 1, wherein said providing step comprises the steps of:

assigning a plurality of base stations with an identical code sequence offset defining an identical code sequence for each of said base stations, said plurality of base stations including said at least one base station;

supplying said synchronization signal to a plurality of delay devices having separate synchronization delays corresponding to said transmission delays, respectively;

outputting delayed synchronization signals from said delay devices to said base stations, respectively; and outputting said spread spectrum signals from said base stations at time intervals corresponding to said synchronization delays, respectively, said spread spectrum signals being identical.

13. A method as recited in claim 12, wherein each of said synchronization delays have delay values corresponding to said search interval divided by the number of said antennas.

14. A method as recited in claim 1, wherein said providing step comprises the step of:

(a) generating within said at least one base station a first spread spectrum signal in response to said synchronization signal and in accordance with said assigned code sequence;

(b) supplying said first spread spectrum signal to a plurality of transmission paths corresponding to said antennas, each of said transmission paths comprising said corresponding transmission delay, said transmission paths supplying said spread spectrum signals to said antennas, respectively.

15. A method as recited in claim 14, wherein said providing step further comprises the steps of:

inputting said first spread spectrum signal supplied on said transmission paths into delay devices having predetermined device delays, respectively;

outputting the spread spectrum signals from said delay devices to said antennas, respectively.

16. A method as recited in claim 15, wherein said transmission delays of said transmission paths comprise said predetermined device delays and propagation delays of said transmission paths, respectively.

17. The method of claim 1, wherein the number of said antennas providing the overlapping regions is at least three.

18. In a communications system providing wireless communications services to a plurality of subscriber stations in an urban serving area, the communications system comprising a plurality of base stations and a plurality of antennas spatially distributed around said urban serving area and coupled to a corresponding one of said base stations, a method for providing spread spectrum-processed information signals to said urban serving area comprising the steps of:

assigning identical code sequences to each of said base stations, said assigned code sequences comprising a sequence of codes having a predetermined chip interval;

supplying the subscriber information signal to the base stations;

successively supplying a synchronization signal to said base stations at corresponding delay intervals greater than said chip interval and less than a search interval of said subscriber stations.

19. A method as recited in claim 18, wherein each of said delay intervals is within a range greater than one microsecond and less than forty microseconds.

20. A method as recited in claim 19, wherein each of said delay intervals is substantially equal to three microseconds.

21. The method of claim 18, further comprising:

successively outputting identical pilot code sequences at said corresponding delay intervals from the respective base stations; and transmitting the output pilot code sequences at the corresponding delay intervals.

22. The method of claim 21, wherein the transmitting step comprises transmitting the output pilot sequences from the respective antennas into the urban serving area to form overlapping coverage regions that minimize shadowing effects.

23. In a communications system providing wireless communications services to a plurality of subscriber stations in an urban serving area, the communications system comprising at least one base station and a plurality of antennas spatially distributed around said urban serving area, a method for providing spread spectrum-processed information signals to said urban serving area comprising the steps of:

outputting a spread spectrum-processed information signal from said at least one base station;

successively supplying said spread spectrum-processed information signal to said antennas at corresponding delay intervals greater than said chip interval and less than a search interval of said subscriber stations; and transmitting the successively delayed spread spectrum-processed information signals from the respective antennas into the urban serving area to form overlapping coverage regions that minimize shadowing effects.

24. A method as recited in claim 23, wherein each of said delay intervals is within a range greater than one microsecond and less than forty microseconds.

25. A method as recited in claim 24, wherein each of said delay intervals is substantially equal to three microseconds.

26. The method of claim 23, wherein the number of said antennas providing said overlapping coverage regions is at least three.

27. The method of claim 26, wherein the transmitting step comprises transmitting the output pilot sequences from the respective antennas into the urban serving area to form overlapping coverage regions that minimize shadowing effects.

28. A communications system providing code division multiple access (CDMA) wireless services to a plurality of subscriber stations in an urban serving area, comprising:

a system clock source;

at least one base station outputting CDMA modulated information on a forward channel;

a plurality of antennas transmitting said CDMA modulated information distributed around said urban serving areas to minimize shadowing effects; and means for supplying said CDMA modulated information to said antennas at successive delay intervals sufficient to minimize multipath fading between the transmitted CDMA modulated information;

wherein said system comprises a plurality of said base stations performing CDMA processing using identical code sequences, said supplying means comprising a series of delay devices receiving said system clock from said system clock source, each of said delay devices outputting a delayed system clock to a corresponding one of said base stations at a unique synchronization delay interval.

29. A system as recited in claim 28, wherein each of said unique synchronization delay intervals of said corresponding delay devices is within a range between a predetermined chip rate and a scan window interval of said subscriber stations.

30. A communications system providing code division multiple access (CDMA) wireless services to a plurality of subscriber stations in an urban serving area, comprising:

a system clock source;

at least one base station outputting CDMA modulated information on a forward channel;

a plurality of antennas transmitting said CDMA modulated information distributed around said urban serving areas to minimize shadowing effects; and means for supplying said CDMA modulated information to said antennas at successive delay intervals sufficient to minimize multipath fading between the transmitted CDMA modulated information;

wherein said supplying means comprises a series of delay devices receiving said CDMA modulated information from said at least one base station, each of said delay devices outputting delayed CDMA modulated information to a corresponding one of said antennas at a unique synchronization delay interval.

31. A system as recited in claim 30, wherein each of said unique synchronization delay intervals of said corresponding delay devices is within a range between a predetermined chip rate and a scan window interval of said subscriber stations.

32. A communications system providing code division multiple access (CDMA) wireless services to a plurality of subscriber stations in an urban serving area, comprising:

a system clock source;

at least one base station outputting CDMA modulated information on a forward channel;

a plurality of antennas transmitting said CDMA modulated information distributed around said urban serving areas to minimize shadowing effects; and means for supplying said CDMA modulated information to said antennas at successive delay intervals sufficient to minimize multipath fading between the transmitted CDMA modulated information, wherein each of said delay intervals is within a range greater than one microsecond and less than forty microseconds; and wherein each of said delay intervals is substantially equal to ten microseconds.

33. In a communications system providing wireless communications services to a plurality of subscriber stations in an urban serving area, the communications system comprising at least one base station outputting a spread spectrum signal generated in response to a subscriber information signal and an assigned code sequence having a predetermined chip interval, and a plurality of antennas spatially distributed around said urban serving area, a method for providing spread spectrum-processed information signals to said urban serving area comprising the steps of:

supplying the subscriber information signal to the at least one base station;

supplying a synchronization signal to said at least one base station, said synchronization signal corresponding to a system clock;

providing to said antennas corresponding spread spectrum signals from said at least one base station, each of said spread spectrum signals received by said corresponding antenna having a corresponding transmission delay relative to the other spread spectrum signals, said corresponding transmission delay being greater than said chip interval and less than a base station sequence offset of said at least one base station; and transmitting the spread spectrum signals from the respective antennas into the urban serving area to form overlapping coverage regions that minimize shadowing effects.

34. A method as recited in claim 33, wherein said transmission delay is within a range greater than one microsecond and less than forty microseconds.

35. A method as recited in claim 34, wherein said transmission delay is substantially equal to three microseconds.

36. A method as recited in claim 34, wherein said transmission delay is substantially equal to ten microseconds.

37. A method as recited in claim 33, wherein said providing step comprises the steps of:

assigning a plurality of base stations with an identical code sequence for each of said base stations, said plurality of base stations including said at least one base station;

supplying said synchronization signal to a plurality of delay devices having separate synchronization delays corresponding to said transmission delays, respectively;

outputting delayed synchronization signals from said delay devices to said base stations, respectively; and outputting said spread spectrum signals from said base stations at time intervals corresponding to said synchronization delays, respectively, said spread spectrum signals being identical.

38. A method as recited in claim 37, wherein each of said synchronization delays have delay values corresponding to said search interval divided by the number of said antennas.

39. A method as recited in claim 33, wherein said providing step comprises the step of:

(a) generating within said at least one base station a first spread spectrum signal in response to said synchronization signal and in accordance with said assigned code sequence;

(b) supplying said first spread spectrum signal to a plurality of transmission paths corresponding to said antennas, each of said transmission paths comprising said corresponding transmission delay, said transmission paths supplying said spread spectrum signals to said antennas, respectively.

40. A method as recited in claim 39, wherein said providing step further comprises the steps of:

inputting said first spread spectrum signal supplied on said transmission paths into delay devices having predetermined device delays, respectively;

outputting the spread spectrum signals from said delay devices to said antennas, respectively.

41. A method as recited in claim 40, wherein said transmission delays of said transmission paths comprise said predetermined device delays and propagation delays of said transmission paths, respectively.

42. The method of claim 33, wherein the number of said antennas providing said overlapping coverage regions is at least three.

43. In a communications system providing wireless communications services to a plurality of subscriber stations in an urban serving area, the communications system comprising a plurality of base stations and a plurality of antennas spatially distributed around said urban serving area and coupled to a corresponding one of said base stations, a method for providing spread spectrum-processed information signals to said urban serving area comprising the steps of:

assigning identical code sequences to each of said base stations, said assigned code sequences comprising a sequence of codes having a a predetermined chip interval;

supplying the subscriber information signal to the base stations;

successively supplying a synchronization signal to said base stations at corresponding delay intervals greater than said chip interval and less than a base station sequence offset of said base stations.

44. A method as recited in claim 43, wherein each of said delay intervals is within a range greater than one microsecond and less than forty microseconds.

45. A method as recited in claim 44, wherein each of said delay intervals is substantially equal to three microseconds.

46. The method of claim further comprising:

successively outputting identical pilot code sequences at said corresponding delay intervals from the respective base stations; and transmitting the output pilot code sequences at the corresponding delay intervals.

47. In a communications system providing wireless communications services to a plurality of subscriber stations in an urban serving area, the communications system comprising at least one base station and a plurality of antennas spatially distributed around said urban serving area, a method for providing spread spectrum-processed information signals to said urban serving area comprising the steps of:

outputting a spread spectrum-processed information signal from said at least one base station;

successively supplying said spread spectrum-processed information signal to said antennas at corresponding delay intervals greater than said chip interval and less than a base station sequence offset of said at least one base station; and transmitting the spread spectrum signals from the respective antennas into the urban serving area to form overlapping coverage regions that minimize shadowing effects.

48. A method as recited in claim 47, wherein each of said delay intervals is within a range greater than one microsecond and less than forty microseconds.

49. A method as recited in claim 48, wherein each of said delay intervals is substantially equal to three microseconds.

50. A method as recited in claim 48, wherein each of said delay intervals is substantially equal to ten microseconds.

51. The method of claim 47, wherein the number of said antennas providing said overlapping coverage regions is at least three.

* * * * *